United States Patent Office 3,340,464
Patented Sept. 5, 1967

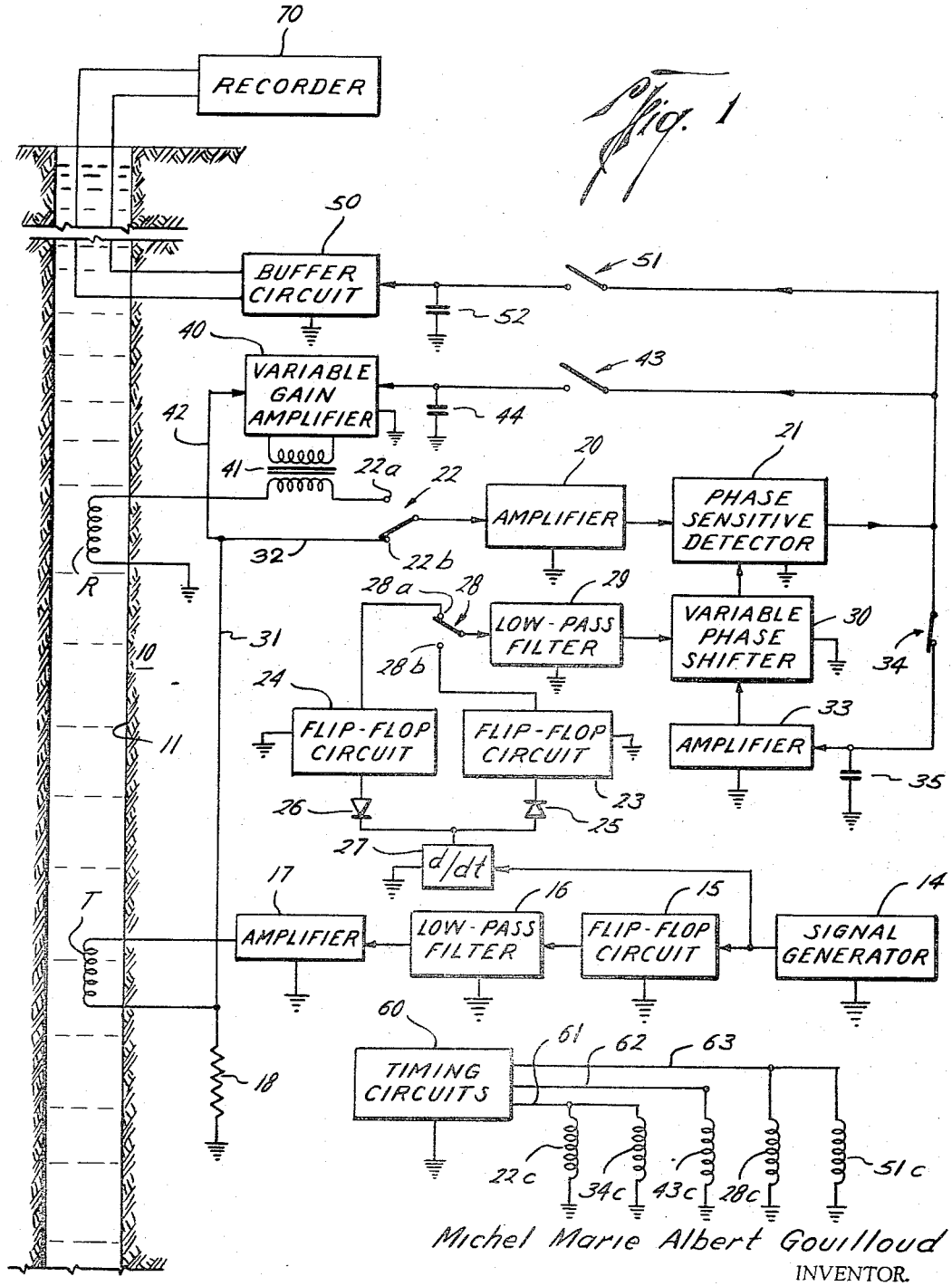

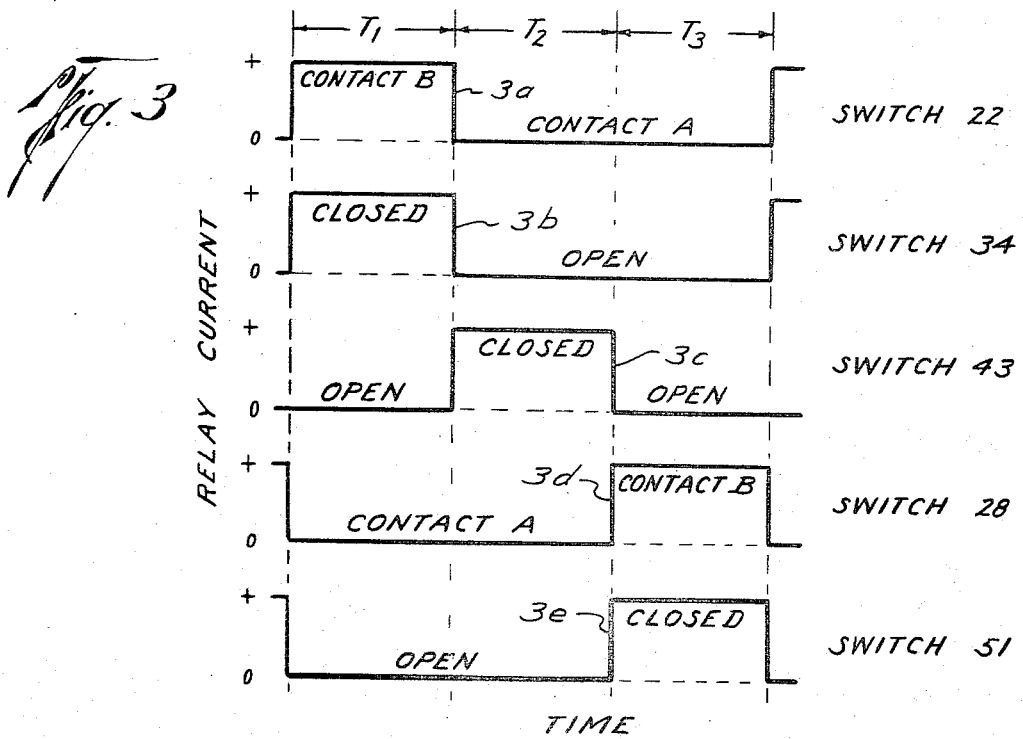
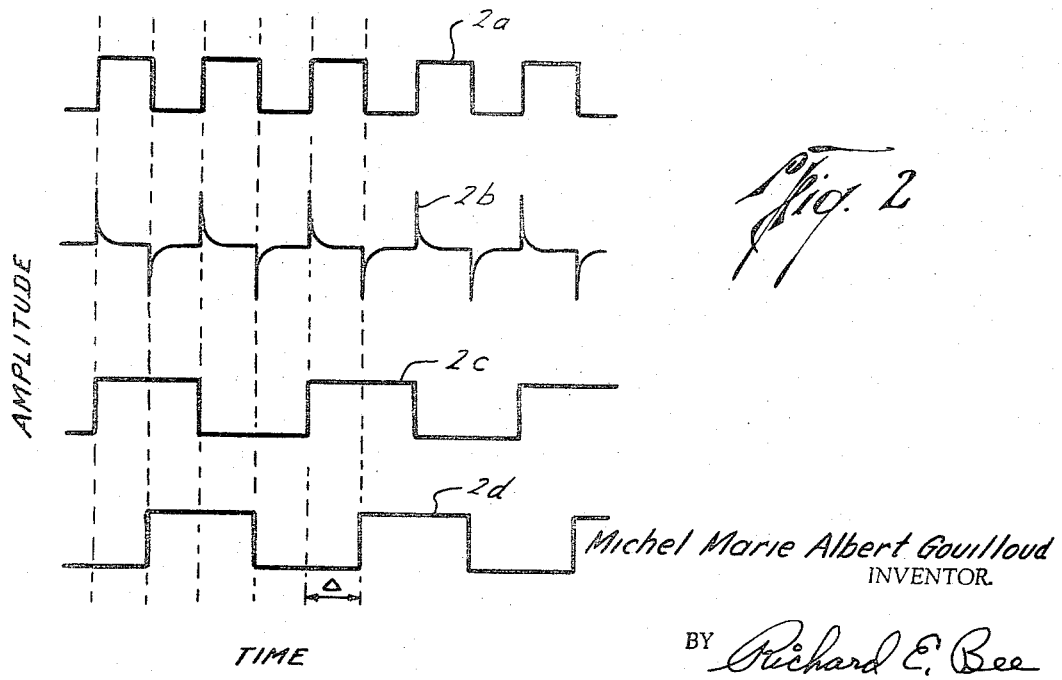

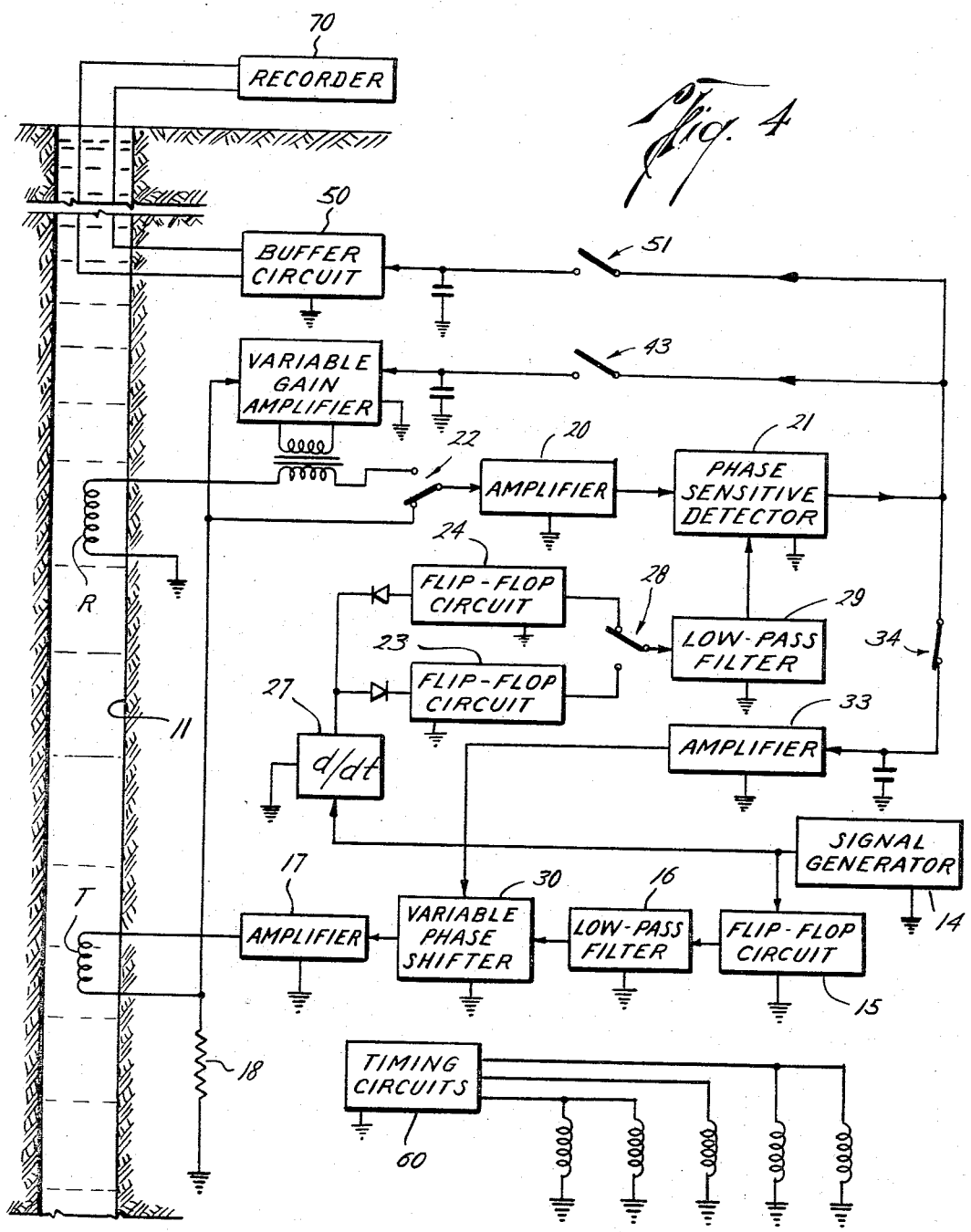

3,340,464
INDUCTION INVESTIGATION APPARATUS HAVING TIME SHARED OPERATIONS INCLUDING PHASE CALIBRATION
Michel Marie Albert Gouilloud, Paris, France, assignor to Societe de Prospection Electrique Schlumberger, S.A., Paris, France, a corporation of France
Filed July 3, 1963, Ser. No. 292,639
Claims priority, application France, July 7, 1962, 903,329
17 Claims. (Cl. 324—6)

ABSTRACT OF THE DISCLOSURE

The disclosure of this invention shows, in connection with induction apparatus having transmitter and receiver coils for investigating various materials, a technique for performing various functions in connection with said investigation on a time sharing basis. During first periodic time intervals, the phase relationship between the phase selection angle of a phase selective network to which the receiver coil signal is applied and the phase of the transmitter current is adjusted to a desired phase relationship. This can be accomplished by either adjusting the phase selection angle of the phase selective circuit or the phase of the transmitter coil current. During other periodic time intervals, the magnitude of an undesired phase component of the receiver coil is determined for adjusting a phase rejection network to substantially cancel out the undesired phase, and the desired signal indicative of the investigated material is measured and recorded.

---

This invention relates to induction apparatus for investigating various materials and, particularly, to induction apparatus for the non-destructive testing of various objects and materials for purposes of investigating their electrical characteristics. The present invention is particularly useful in making quantitative measurements of electrical conductivities of various materials.

It has been heretofore proposed to utilize a system of induction coils for purposes of determining the electrical conductivity of a material being investigated. Such a coil system includes a transmitter coil for inducing current flow in the material being investigated and a detector or receiver coil for developing a signal representative of the induced current flow. This receiver coil signal is, under optimum conditions, proportional to the conductivity of the material being investigated. The greater the conductivity of the material, the greater the magnitude of the induced current flow and, hence, the greater is the magnitude of the signal induced in the receiver coil by this current flow.

This type of induction apparatus is useful, for example, in investigating the nature of the earth formations traversed by a borehole drilled into the earth. It enables a determination of whether the subsurface formations are saturated with a more-conductive formation water or a less-conductive hydrocarbon fluid, such as oil or gas.

Various problems have been encountered in the use of this type of induction apparatus. One major source of difficulty results from the fact that the desired signal resulting from the induced current flow in the material being investigated is frequently relatively small, while at the same time there tends to be induced in the receiver coil a considerably larger signal resulting from direct mutual coupling between the transmitter and receiver coils. Fortunately, the undesired direct mutual signal and the desired signal resulting from the induced current flow differ in phase from one another by a factor of 90°. Consequently, phase selective type circuits can be used to help discriminate between the two signals.

Nevertheless, various problems remain. In particular, since the desired signal is usually relatively small, it is necessary to amplify the receiver coil signal by a considerable amount before it is supplied to a phase selective circuit. If, however, a substantial amount of the undesired direct mutual signal is also present, it will overload or saturate the receiver coil amplifier. Means are usually provided, therefore, for balancing out the direct mutual component before it has a chance to reach the amplifier circuit.

If the apparatus is in proper adjustment, fairly satisfactory measurements can be obtained. It has been found, however, that the operating characteristics of the various circuits which are used with the coil system are subject to change with time, temperature, and the like. In particular, it has been discovered, that the phase shift characteristic of the receiver coil amplifier tends to change or drift from its initial condition. This introduces a direct error into the measurements because the phase selective circuit will not be operating at the correct phase angle with respect to the signal supplied thereto. Also, if automatic balancing circuits are used for balancing out the undesired direct mutual component, this change in amplifier phase shift impairs the balancing action and causes more of the direct mutual component to be supplied to the receiver coil amplifier. This, in turn, leads to saturation of such amplifier. Other sources of undesired phase shift changes in the apparatus will produce similar undesired results.

It is an object of the invention, therefore, to provide new and improved induction type investigating apparatus which substantially avoids one or more of the foregoing limitations.

It is another object of the invention to provide new and improved induction type investigating apparatus which automatically compensates for various errors arising from undesired changes in circuit operating characteristics.

It is a further object of the invention to provide new and improved induction type borehole investigating apparatus which provides more accurate and more consistent measurements of the electrical conductivity of the earth material adjacent the borehole.

It is an additional object of the invention to provide new and improved induction type borehole apparatus which automatically compensates for undesired phase shift changes in the receiver coil amplifier.

In accordance with one feature of the invention, induction apparatus for investigating various materials comprises a transmitter coil for inducing current flow in the material being investigated and a receiver coil for developing a signal representative of the induced current flow. The induction apparatus also includes circuit means for supplying energizing current to the transmitter coil and amplifier circuit means for amplifying the receiver coil signal. The induction apparatus further includes phase sensitive circuit means coupled to the output of the amplifier circuit means. It also includes circuit means for supplying a phase reference signal to the phase sensitive circuit means. The induction apparatus further includes circuit means for supplying to the input of the amplifier circuit means a phase calibration signal having a known phase relationship with respect to the transmitter coil current. The induction apparatus additionally includes circuit means for adjusting one of the transmitter coil current and the phase reference signal for providing a predetermined phase relationship between the amplified phase calibration signal and the phase reference signal.

For a better understanding of the present invention, together with other and further objects and features thereof, reference is had to the following description taken in connection with the accompanying drawings, the scope of the invention being pointed out in the appended claims.

Referring to the drawings:

FIG. 1 illustrates in a schematic manner a representative embodiment of induction apparatus constructed in accordance with the present invention;

FIG. 2 illustrates in a graphical manner various signal waveforms occurring in the FIG. 1 apparatus;

FIG. 3 is a timing diagram used in explaining the operation of the FIG. 1 apparatus; and FIG. 4 shows a further embodiment of induction apparatus constructed in accordance with the present invention.

Referring to FIG. 1 of the drawings, there is shown a representative embodiment of induction apparatus constructed in accordance with the present invention. The apparatus is illustrated for the case where it is used to investigate earth formations 10 traversed by a borehole 11. In this case, the apparatus includes a coil system adapted for movement through the borehole 11. The coil system includes at least one transmitter coil T and at least one receiver coil R. These coils are mounted on a non-conductive, non-magnetic portion of a suitable instrument housing which is suspended from the surface of the earth by way of an appropriate cable. Included within the downhole instrument housing is circuit means for supplying energizing current to the transmitter coil T. This circuit means includes a signal generator 14 for generating a square-wave type signal at a frequency of, for example, 40 kilocycles per second. This signal is represented by waveform 2a of FIG. 2. It is supplied to a bistable flip-flop circuit 15 which is responsive to the positive-going transitions therein for developing a square-wave signal having a frequency of one-half the signal generator frequency, which, for the present example, would be 20 kilocycles per second. This 20 kc. signal from the flip-flop circuit 15 is supplied by way of a low-pass filter 16 to an amplifier 17. Filter 16 removes the high-frequency components and effectively converts the 20 kc. square-wave to a 20 kc. sine wave. This 20 kc. sine wave signal is amplified by the amplifier 17 to produce a 20 kc. alternating current which is fed to the transmitter coil T. This transmitter coil current is returned to the amplifier 17 by way of a resistor 18 and the appropriate chassis ground connections. Resistor 18 is of relatively small value.

The FIG. 1 apparatus also includes a phase selective signal channel for developing an output signal representative of a single phase component of the receiver coil signal. This signal channel includes an amplifier circuit means, represented by an amplifier 20, and a phase sensitive circuit means, represented by a phase sensitive detector 21. A relay-controlled switch 22 is provided for coupling the input of the amplifier 20 to the receiver coil R during appropriate operating intervals.

The FIG. 1 apparatus further includes circuit means for supplying phase reference signals to the phase sensitive detector 21. This circuit means includes a pair of bistable flip-flop circuits 23 and 24 which are coupled by way of respective ones of diodes 25 and 26 and a common differentiating circuit 27 to the output of the signal generator 14. The signal appearing at the output of differentiating circuit 27 is represented by waveform 2b of FIG. 2. The positive-going pulses or spikes in this waveform are passed by the diode 25 and are used to drive the flip-flop circuit 23. The negative-going pulses or spikes, on the other hand, are passed by the diode 26 and are used to drive the flip-flop circuit 24. The resulting waveforms at the outputs of flip-flop circuits 23 and 24 are represented by waveforms 2c and 2d of FIG. 2, respectively. Each of these signals has a frequency of one-half the frequency of signal generator 14, which, in the present example, is a frequency of 20 kilocycles per second. These flip-flop signals are in phase quadrature with one another, that is, they differ in phase from one another by a factor of 90°. They are selectively supplied by a relay-controlled switch 28 to the input of a common low-pass filter 29. Filter 29 serves to filter out the high-frequency components and to convert the square-wave signals to sinusoidal type signals. The sinusoidal signal appearing at the output of low-pass filter 29 is supplied by way of a variable phase shifter 30 to a second input of the phase sensitive detector 21. This sinusoidal signal provides a phase reference signal for the phase sensitive detector 21. As such, it determines the phase selection angle of the detector 21.

The apparatus of FIG. 1 also includes circuit means for supplying to the input of the amplifier 20 a phase calibration signal having a known phase relationship with respect to the current flowing in transmitter coil T. This circuit means includes the resistor 18, conductors 31 and 32, and the relay-controlled switch 22.

The present apparatus further includes circuit means for adjusting the phase reference signal supplied to the phase sensitive detector 21 for providing a predetermined phase relationship between the amplified phase calibration signal and such phase reference signal. This circuit means includes an amplifier 33 which is coupled to the output of the phase sensitive detector 21 by way of a relay-controlled switch 34. A storage capacitor 35 is coupled across the input of amplifier 33. This circuit means further includes the phase shift circuit means represented by the variable phase shifter 30. This phase shifter 30 is controlled by the output of amplifier 33 for purposes of adjusting the phase angle of the phase reference signal supplied to the second input of the phase sensitive detector 21.

The FIG. 1 apparatus also includes circuit means responsive to the output of the phase sensitive detector 21 for minimizing an undesired phase component in the receiver coil signal. This circuit means includes a variable gain amplifier 40. The output of variable gain amplifier 40 is coupled in series with the receiver coil R by means of a transformer 41. The input of amplifier 40 is driven by the alternating-current signal developed across resistor 18 and which is supplied thereto by way of conductor 31 and a second conductor 42. The gain of amplifier 40 is controlled by way of a direct-current type of signal which is obtained from the output of phase sensitive detector 21 by way of a relay-controlled switch 43. A storage capacitor 44 is coupled across the gain control terminals of the amplifier 40.

The FIG. 1 apparatus further includes circuit means responsive to the output of the phase sensitive detector 21 for providing a signal representative of a desired phase component of the receiver coil signal. This circuit means includes a buffer circuit 50 which is coupled to the output of phase sensitive detector 21 by way of a relay-controlled switch 51. A storage capacitor 52 is coupled across the input of buffer circuit 50.

Amplifier 33, the gain control terminals of variable gain amplifier 40 and buffer circuit 50 are provided with relatively high input impedances to prevent rapid discharge of the respective storage capacitors 35, 44, and 52. The phase sensitive detector 21, on the other hand, is provided with a relatively low output impedance for enabling rapid adjustment of the voltages on the various storage capacitors.

The various relay-controlled switches 22, 28, 34, 43, and 51 are controlled by appropriate timing circuits 60, which are used to drive relay coils 22c, 28c, 34c, 43c, and 51c which are individually associated with respective ones of these switches. Timing circuits 60 are constructed so that each of three output lines 61, 62, and 63 thereof are energized with periodic pulses of control current, with the pulses on the different lines being offset from one another so that no two lines are energized at the same time. In each case, the relay current pulse rate is the same and may be, for example, 30 pulses per second. To this end, the timing circuits 60 may include a signal generator for generating timing signals at a rate of 90 cycles per second, a 3:1 counter for counting these timing signals and three individual current sources which are controlled by the 3:1 counter. Instead, a motor-driven rotary switch may be used for connecting the three lines 61, 62, and 63 one after another in succession to a common current source.

The desired signal appearing at the output of buffer circuit 50 is supplied by way of suitable cable conductors to a recorder 70 located at the surface of the earth. This signal is representative of the electrical conductivity of the earth material adjacent the borehole 11.

Except for the recorder 70, which is located at the surface of the earth, the circuits shown in FIG. 1 are located within the borehole instrument housing on which the transmitter and receiver coils T and R are mounted.

Considering now the operation of the FIG. 1 apparatus, the transmitter coil T is continuously energized with 20 kc. alternating current supplied thereto by the amplifier 17, while the downhole instrument housing including the transmitter and receiver coils and the electrical circuits associated therewith is moved through the borehole 11, usually in a continuous manner. During this movement, the various circuits associated with the receiver coil R perform the desired operations in a repetitive manner, each operation being performed once during a complete operating cycle. These operating cycles are repeated at a relatively rapid rate compared to the rate of movement of the coil system through the borehole 11. As a consequence, the signal supplied to the recorder 70 at the surface of the earth represents, in effect, a continuous measurement of the conductivity of the earth material along the length of the borehole 11.

Each complete operating cycle for the receiver coil circuits is broken down into three successive time intervals $T_1$, $T_2$, and $T_3$. During the first time interval $T_1$, the circuits operate to automatically compensate for any phase shift changes that may have occurred. During the second time interval $T_2$, the circuits operate to automatically make any necessary readjustment in the balancing out of the undesired direct mutual component in the receiver coil signal. During the third time interval $T_3$, the circuits operate to measure the desired component of the receiver coil signal and to develop a signal representative thereof for recording by the recorder 70 located at the surface of the earth.

Considering these operations in greater detail, this will be done with the aid of the time diagrams of FIG. 3. The various waveforms of FIG. 3 represent the waveforms for the currents flowing through the various relay coils 22c, 28c, 34c, 43c, and 51c. Waveform 3a represents the current flow through relay coil 22c, waveform 3b represents the current flow through relay coil 34c, etc. As such, they also indicate the positions of the various switches 22, 28, 34, 43, and 51 at any given moment during the operating cycle.

During the first time interval $T_1$ of each operating cycle, the circuits of FIG. 1 are operative to adjust the phase selection angle of the phase sensitive detector 21 relative to the phase of the current flowing through the transmitter coil T. This will compensate for any phase shift changes that may have occurred since the last adjustment interval. To this end, the blade of switch 22 is at contact 22b and, as a consequence, the phase calibration signal developed across the resistor 18 is supplied to the input of the amplifier 20. This phase calibration signal, as it appears across the resistor 18, is accurately in phase with the current flowing through the transmitter coil T. This phase calibration signal is amplified by the amplifier 20 and experiences any phase shift present therein. It is then supplied to the first input of the phase sensitive detector 21. At the same time, the blade of switch 28 is at contact 28a. This provides a phase reference signal for the phase sensitive detector 21 which is obtained from the flip-flop circuit 24. This phase reference signal is nominally in phase quadrature with the transmitter coil current and is supplied by way of the variable phase shifter 30 to the second input of the phase sensitive detector 21.

If the signals at the two inputs of the phase sensitive detector 21 are accurately in quadrature with one another, then no output signal appears at the output thereof. If, on the other hand, the signals are not in phase quadrature, then there appears at the output of the detector 21 a direct-current type of signal the magnitude of which is more or less proportional to the angular departure from the desired quadrature relationship. Any such signal at the output of detector 21 constitutes an error signal and is supplied by way of a switch 34, which is closed during $T_1$, and an amplifier 33 to the phase control terminals of the variable phase shifter 30. This error signal acts to adjust the phase shift provided by the phase shifter 30 so as to reduce the error to a very small value approximating zero. In other words, the feedback control loop formed by the detector 21, amplifier 33, and the variable phase shifter 30 operate to automatically provide the desired quadrature relationship between the signals supplied to the two inputs of the detector 21. During time intervals when the switch 34 is open, the storage capacitor 35 serves to maintain the appropriate error voltage across the input of amplifier 33 so that the phase shift of phase shifter 30 remains at the value established during the immediately preceding adjustment interval.

During the second time interval $T_2$ of each operating cycle, the circuits of FIG. 1 are operated to make any necessary adjustment for minimizing the undesired component in the receiver coil signal. Thus, during the time interval $T_2$, the blade of switch 22 is at contact 22a. This couples the receiver coil R to the input of amplifier 20. At the same time, the blade of switch 28 remains at contact 28a and switch 43 is closed, while switches 34 and 51 are open. The undesired phase components appearing across the receiver coil R in phase quadrature with the current flowing through the transmitter coil T. These components, some of which tend to be relatively large, are largely balanced out by an opposite-polarity quadrature-phased signal which is developed across the secondary winding of the transformer 41 and which is supplied thereto by the variable gain amplifier 40. This opposite-polarity signal is obtained by amplifying the alternating-current signal appearing across the resistor 18. The necessary 90° phase shift is provided by the transformer 41.

Assuming for the moment that the gain setting of the variable gain amplifier 40 is somewhat incorrect for the particular conditions being encountered at the moment, then the undesired quadrature component across the receiver coil R will not be completely cancelled and some residual quadrature component will be supplied to the input of the amplifier 20. Since the blade of switch 28 is still at the contact 28a, the phase reference signal supplied to the phase sensitive detector 21 is of the appropriate phase to detect this residual quadrature component. This residual quadrature component may have experienced some additional phase shift in passing through the amplifier 20. Nevertheless, the previous adjustment of the phase shifter 30 is such that the phase reference signal supplied to the detector 21 has also been shifted by this same amount. Thus, the phase sensitive detector 21 operates to detect this undesired residual component and provide an accurate indication thereof. This indication, which is in the form of a direct-current type signal appearing at the output of phase sensitive detector 21, is than supplied by way of the switch 43, which is now closed, to the gain control terminals of the variable gain amplifier 40. This direct-current error signal then operates to adjust the gain of the amplifier 40 so as to minimize the error, i.e., so as to reduce the signal at the output of phase sensitive detector 21 to a very small value approximating zero. The storage capacitor 44 across the gain control terminals of the variable gain amplifier 40 serves to maintain this adjustment during time intervals when the switch 43 is open.

During the third time interval $T_3$ of each operating cycle, the apparatus of FIG. 1 is operative to provide a signal representative of the desired phase component of the receiver coil signal. Thus, during the $T_3$ time interval, the blade of switch 22 remains at contact 22a so that the receiver coil R remains coupled to the input of amplifier 20. During this same interval, the blade of switch 28 is now at the other contact 28b. This means that the phase reference signal for the phase sensitive detector 21 is now being derived from the signal provided by the flip-flop circuit 23. Since the signal from flip-flop circuit 23 is exactly 90° out of phase with respect to that provided by the flip-flop 24, this means that the phase reference signal supplied to the second input of the phase sensitive detector 21 is, in effect, shifted by a factor of 90°. This is done because the desired receiver coil component differs in phase by a factor of 90° from the previously-considered undesired component. In other words, as it appears across the receiver coil R, the desired component is in phase with the transmitter coil current, while the undesired component is in phase quadrature with the transmitter coil current, the difference being a factor of 90°. Thus, the phase sensitive detector 21 is now operative to detect the desired phase component of the receiver coil signal. As a consequence, there appears at the output of the detector 21 a direct-current type signal which is proportional in magnitude to the magnitude of this desired component.

Even if the desired signal experiences some additional phase shift in the amplifier 20 so that, as it appears at the output of the amplifier 20, it is no longer precisely in phase with the transmitter coil current, this change in phase is taken into account in the phase sensitive detector 21, since the variable phase shifter 30 has been previously adjusted so that the phase reference signal supplied to the second input of the detector 21 is shifted by this same amount. Thus, the signal at the output of the phase sensitive detector 21 is a highly accurate measurement of the desired phase component of the receiver coil signal.

The signal at the output of detector 21 is supplied by way of the switch 51, which is closed during the $T_3$ time interval, to the buffer circuit 50 and, from there, to the recorder 70 located at the surface of the earth. The storage capacitor 52 across the input of the buffer circuit 50 serves to preserve this desired output signal during time intervals when the switch 51 is open. Since the switch 51 is periodically closed at a relatively high rate, the signal supplied to the recorder 70 is, in effect, of a continuous nature.

Referring now to FIG. 4 of the drawings, there is shown a modified embodiment of the present invention. The embodiment of FIG. 4 is similar to that of FIG. 1 except that the location of the variable phase shifter 30 has been changed. In particular, in FIG. 4, the variable phase shifter 30 is connected in cascade between the low-pass filter 16 and the amplifier 17. At the same time, the low-pass filter 29 is now connected directly to the second input of the phase sensitive detector 21. As a consequence of these modifications, the quantity which is adjusted during the first time interval $T_1$ of each cycle is the phase angle of the current supplied to the transmitter coil T. At the same time, no phase adjustment is provided for the phase reference signal supplied to the second input of the phase sensitive detector 21. Thus, the phase of the transmitter coil current is adjusted to provide the desired quadrature relationship between the signals supplied to the two inputs of the phase sensitive detector 21 during the $T_1$ time interval. Other than this, the operation of the FIG. 4 embodiment is similar to that of the FIG. 1 embodiment.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Induction apparatus for investigating various materials comprising:
    a transmitter coil for inducing current flow in the material being investigated;
    a receiver coil for developing a signal representative of the induced current flow;
    circuit means for supplying energizing current to the transmitter coil;
    amplifier circuit means for amplifying the receiver coil signal;
    phase sensitive circuit means coupled to the output of the amplifier circuit means;
    circuit means for supplying a phase reference signal to the phase sensitive circuit means;
    circuit means for supplying to the input of the amplifier circuit means a phase calibration signal having a known phase relationship with respect to the transmitter coil current;
    and circuit means for adjusting one of the transmitter coil current and the phase reference signal for providing a predetermined phase relationship between the amplified phase calibration signal and the phase reference signal.

2. Induction apparatus for investigating various materials comprising:
    a transmitter coil for inducing current flow in the material being investigated;
    a receiver coil for developing a signal representative of the induced current flow;
    circuit means for supplying energizing current to the transmitter coil;
    amplifier circuit means for amplifying the receiver coil signal;
    phase sensitive circuit means coupled to the output of the amplifier circuit means;
    circuit means for supplying a phase reference signal to the phase sensitive circuit means;
    circuit means for supplying to the input of the amplifier circuit means a phase calibration signal which is in phase with the transmitter coil current;
    and circuit means for adjusting the phase of the phase reference signal for providing a predetermined phase relationship between the amplifier phase calibration signal and the phase reference signal.

3. Induction apparatus for investigating various materials comprising:
    a transmitter coil for inducing current flow in the material being investigated;
    a receiver coil for developing a signal representative of the induced current flow;
    circuit means for supplying energizing current to the transmitter coil;
    amplifier circuit means for amplifying the receiver coil signal;
    phase sensitive circuit means coupled to the output of the amplifier circuit means;
    circuit means for supplying a phase reference signal to the phase sensitive circuit means;
    circuit means for supplying to the input of the amplifier circuit means a phase calibration signal which is in phase with the transmitter coil current;
    and circuit means for adjusting the phase of the transmitter coil current for providing a predetermined phase relationship between the amplified phase calibration signal and the phase reference signal.

4. Induction apparatus for investigating various materials comprising:
    a transmitter coil for inducing current flow in the material being investigated;

a receiver coil for developing a signal representative of the induced current flow;

circuit means for supplying energizing current to the transmitter coil;

amplifier circuit means;

phase sensitive circuit means coupled to the output of the amplifier circuit means;

circuit means for supplying a phase reference signal to the phase sensitive circuit means;

circuit means operative during a first time interval for supplying to the input of the amplifier circuit means a phase calibration signal having a known phase relationship with respect to the transmitter coil current;

circuit means for adjusting one of the transmitter coil current and the phase reference signal for providing a predetermined phase relationship between the amplified phase calibration signal and the phase reference signal;

circuit means operative during a second time interval for coupling the receiver coil to the input of the amplifier circuit means;

and circuit means for providing an indication of the signal appearing at the output of the phase sensitive circuit means during the second time interval.

5. Induction apparatus for investigating various materials comprising:

a transmitter coil for inducing current flow in the material being investigated;

a receiver coil for developing a signal representative of the induced current flow;

circuit means for supplying energizing current to the transmitter coil;

amplifier circuit means;

a phase sensitive detector circuit coupled to the output of the amplifier circuit means;

circuit means for supplying a phase reference signal to the phase sensitive detector circuit;

circuit means operative during a first time interval for supplying to the input of the amplifier circuit means a phase calibration signal having a known phase relationship with respect to the transmitter coil current;

circuit means for adjusting one of the transmitter coil current and the phase reference signal for providing a predetermined phase relationship between the amplified phase calibration signal and the phase reference signal;

circuit means operative during a second time interval for coupling the receiver coil to the input of the amplifier circuit means;

and circuit means for providing an indication of the signal appearing at the output of the phase sensitive detector circuit during the second time interval.

6. Induction apparatus for investigating various materials comprising:

a transmitter coil for inducing current flow in the material being investigated;

a receiver coil for developing a signal representative of the induced current flow;

circuit means for supplying energizing current to the transmitter coil;

amplifier circuit means;

phase sensitive circuit means coupled to the output of the amplifier circuit means;

circuit means for supplying a phase reference signal to the phase sensitive circuit means;

circuit means operative during a first time interval for supplying to the input of the amplifier circuit means a phase calibration signal having a known phase relationship with respect to the transmitter coil current;

feedback circuit means operative during the first time interval and responsive to the output of the phase sensitive circuit means for adjusting the phase of one of the transmitter coil current and the phase reference signal for providing a predetermined phase relationship between the amplified phase calibration signal and the phase reference signal;

circuit means operative during a second time interval for coupling the receiver coil to the input of the amplifier circuit means;

and circuit means for providing an indication of the signal appearing at the output of the phase sensitive circuit means during the second time interval.

7. Induction apparatus for investigating various materials comprising:

a transmitter coil for inducing current flow in the material being investigated;

a receiver coil for developing a signal representative of the induced current flow;

supply circuit means for supplying energizing current to the transmitter coil;

amplifier circuit means;

phase sensitive circuit means coupled to the output of the amplifier circuit means;

supply circuit means for supplying a first phase reference signal to the phase sensitive circuit means during a first time interval and for supplying a second phase reference signal to the phase sensitive circuit means during a second time interval, these first and second phase reference signals being in phase quadrature with one another;

circuit means operative during the first time interval for supplying to the input of the amplifier circuit means a phase calibration signal having a known phase relationship with respect to the transmitter coil current;

circuit means operative during the first time interval for adjusting one of the transmitter coil current supply circuit means and the phase reference signal supply circuit means for providing a predetermined phase relationship between the amplified phase calibration signal and the first phase reference signals;

circuit means operative during the second time interval for coupling the receiver coil to the input of the amplifier circuit means;

and circuit means for providing an indication of the signal appearing at the output of the phase sensitive circuit means during the second time interval.

8. Induction apparatus for investigating various materials comprising:

a transmitter coil for inducing current flow in the material being investigated;

a receiver coil for developing a signal representative of the induced current flow;

circuit means for supplying energizing current to the transmitter coil;

amplifier circuit means;

a phase sensitive detector circuit coupled to the output of the amplifier circuit means;

circuit means for supplying first and second phase reference signals which are in phase quadrature with one another;

common phase shift circuit means for supplying the first phase reference signal to the phase sensitive detector circuit during a first time interval and for supplying the second phase reference signal to the phase sensitive detector circuit during a second time interval;

circuit means operative during the first time interval for supplying to the input of the amplifier circuit means a phase calibration signal which is in phase with the transmitter coil current;

circuit means operative during the first time interval for adjusting the common phase shift circuit means for providing a quadrature phase relationship between the amplified phase calibration signal and the phase reference signal supplied to the phase sensitive detector circuit;

circuit means operative during the second time interval for coupling the receiver coil to the input of the amplifier circuit means;

and circuit means for providing an indication of the signal appearing at the output of the phase sensitive detector circuit during the second time interval.

9. Induction apparatus for investigating various materials comprising:

a transmitter coil for inducing current flow in the material being investigated;

a receiver coil for developing a signal representative of the induced current flow;

circuit means for supplying energizing current to the transmitter coil and including phase shift circuit means for adjusting the phase of the transmitter coil current;

amplifier circuit means;

a phase sensitive detector circuit coupled to the output of the amplifier circuit means;

circuit means for supplying a first phase reference signal to the phase sensitive detector circuit during a first time interval and for supplying a second phase reference signal to the phase sensitive detector circuit during a second time interval, these first and second phase reference signals being in phase quadrature with one another;

circuit means operative during the first time interval for supplying to the input of the amplifier circuit means a phase calibration signal which is in phase with the transmitter coil current;

circuit means operative during the first time interval for adjusting the phase shift circuit means for providing a quadrature phase relationship between the amplified phase calibration signal and the phase reference signal supplied to the phase sensitive detector circuit;

circuit means operative during the second time interval for coupling the receiver coil to the input of the amplifier circuit means;

and circuit means for providing an indication of the signal appearing at the output of the phase sensitive detector circuit during the second time interval.

10. Induction apparatus for investigating various materials comprising:

a transmitter coil for inducing current flow in the material being investigated;

a receiver coil for developing a signal representative of the induced current flow;

circuit means for supplying energizing current to the transmitter coil;

amplifier circuit means;

phase sensitive circuit means coupled to the output of the amplifier circuit means;

circuit means for supplying a phase reference signal to the phase sensitive circuit means;

circuit means operative during a first time interval for supplying to the input of the amplifier circuit means a phase calibration signal having a known phase relationship with respect to the transmitter coil current;

circuit means for adjusting one of the transmitter coil current and the phase reference signal for providing a predetermined phase relationship between the amplified phase calibration signal and the phase reference signal;

circuit means operative during second and third time intervals for coupling the receiver coil to the input of the amplifier circuit means;

circuit means operative during the second time interval and responsive to the output of the phase sensitive circuit means for minimizing an undesired phase component in the receiver coil signal;

and circuit means operative during the third time interval and responsive to the output of the phase sensitive circuit means for providing a signal representative of a desired phase component of the receiver coil signal.

11. In induction logging apparatus for investigating earth formations traversed by a borehole, the combination comprising:

a coil system adapted for movement through the borehole and including at least one transmitter coil and at least one receiver coil;

circuit means for supplying energizing current to the transmitter coil;

amplifier circuit means for amplifying the receiver coil signal;

phase sensitive detector circuit means coupled to the output of the amplifier circuit means for developing a signal representative of a signal phase component of the receiver coil signal;

circuit means for supplying a phase reference signal to the phase sensitive detector circuit means;

circuit means for supplying to the input of the amplifier circuit means a distinguishable phase calibration signal having a known phase relationship with respect to the transmitter coil current;

circuit means for adjusting one of the transmitter coil current and the phase reference signal for providing a predetermined phase relationship between the amplified phase calibration signal and the phase reference signal;

and circuit means coupled to the output of the phase sensitive detector circuit means for providing a signal representative of an electrical characteristic of the adjacent formation material.

12. In induction logging apparatus for investigating earth formations traversed by a borehole, the combination comprising:

a coil system adapted for movement through the borehole and including at least one transmitter coil and at least one receiver coil;

circuit means for supplying energizing current to the transmitter coil;

amplifier circuit means for amplifying the receiver coil signal;

phase sensitive detector circuit means coupled to the output of the amplifier circuit means for developing a signal representative of a single phase component of the receiver coil signal;

circuit means for supplying a phase reference signal to the phase sensitive detector circuit means;

circuit means operative during a first time interval for supplying to the input of the amplifier circuit means a phase calibration signal having a known phase relationship with respect to the transmitter coil current;

circuit means for adjusting one of the transmitter coil current and the phase reference signal for providing a predetermined phase relationship between the amplified phase calibration signal and the phase reference signal;

circuit means operative during a second time interval for coupling the receiver coil to the input of the amplifier circuit means;

and circuit means coupled to the output of the phase sensitive detector circuit means and operative during the second time interval for providing a signal representative of an electrical characteristic of the adjacent formation material.

13. In induction logging apparatus for investigating earth formations traversed by a borehole, the combination comprising:

a coil system adapted for movement through the borehole and including at least one transmitter coil and at least one receiver coil;

means for supplying energizing current to the transmitter coil;

means for generatting phase reference signals;

a phase selective signal channel responsive to the generated phase reference signals for developing an output signal representative of a single phase component of the receiver coil signal;

first circuit means operative during first periodic time intervals and responsive to the output of the phase selective signal channel for adjusting the phase of the phase reference signals until the phase selective signal channel output attains a desired value;

second circuit means operative during second periodic time intervals and responsive to the output of the phase selective signal channel for minimizing an undesired phase component in the receiver coil signal;

and third circuit means operative during third periodic time intervals and responsive to the output of the phase selective signal channel for providing a signal representative of a desired phase component of the receiver coil signal.

14. In induction logging apparatus for investigating earth formations traversed by a borehole, the combination comprising:

a coil system adapted for movement through the borehole and including at least one transmitter coil and at least one receiver coil;

means for supplying energizing current to the transmitter coil;

means for generating phase reference signals;

a phase selective signal channel responsive to the generated phase reference signals for developing an output signal representative of a single phase component of the receiver coil signal;

first circuit means operative during first periodic time intervals and responsive to the output of the phase selective signal channel for adjusting the phase of the phase reference signals until the phase selective signal channel output attains a desired value for enabling the signal channel output signal to represent receiver coil components which are in phase quadrature with the transmitter coil current;

second circuit means operative during second periodic time intervals and responsive to the output of the phase selective signal channel for minimizing any quadrature phase component in the receiver coil signal;

and third circuit means operative during third periodic time intervals for shifting the phase selection angle of the phase selective signal channel by a factor of ninety degrees and including circuit means responsive to the output of the phase selective signal channel for providing a signal representative of the in-phase component of the receiver coil signal.

15. In induction logging apparatus for investigating earth formations traversed by a borehole, the combination comprising:

a coil system adapted for movement through the borehole and including at least one transmitter coil and at least one receiver coil;

means for supplying energizing current to the transmitter coil;

means for generating phase reference signals;

a phase selective signal channel responsive to the generated phase reference signals for developing an output signal representative of a single phase component of the receiver coil signal;

circuit means operative during first periodic time intervals and responsive to the output of the phase selective signal channel for adjusting the phase of the phase reference signals until the phase of the phase reference signals is substantially the same as the phase of the transmitter coil current;

and circuit means operative during second periodic time intervals and responsive to the output of the phase selective signal channel for providing a signal representative of a desired phase component of the receiver coil signal.

16. In induction logging apparatus for investigating earth formations traversed by a borehole, the combination comprising:

a coil system adapted for movement through the borehole and including at least one transmitter coil and at least one receiver coil;

means for supplying energizing current to the transmitter coil;

a phase selective signal channel for developing an output signal representative of a single phase component of the receiver coil signal;

circuit means operative during first periodic time intervals and responsive to the output of the phase selective signal channel for minimizing an undesired phase component in the receiver coil signal;

and circuit means operative during second periodic time intervals and responsive to the output of the phase selective signal channel for providing a signal representative of a desired phase component of the receiver coil signal.

17. In induction logging apparatus for investigating earth formations traversed by a borehole, the combination comprising:

a coil system adapted for movement through the borehole and including at least one transmitter coil and at least one receiver coil;

means for supplying energizing current to the transmitter coil;

a phase selective signal channel responsive to phase reference signals for developing an output signal representative of a single phase component of the receiver coil signal;

circuit means for providing phase reference signals having a first phase angle for the phase selective signal channel during first periodic time intervals and for providing phase reference signals having a second phase angle during second periodic time intervals;

circuit means operative during the first periodic time intervals and responsive to the output of the phase selective signal channel for minimizing an undesired phase component in the receiver coil signal;

and circuit means operative during the second periodic time intervals and responsive to the output of the phase selective signal channel for providing a signal representative of a desired phase component of the receiver coil signal.

References Cited

UNITED STATES PATENTS

| | | | |
|---|---|---|---|
| 2,887,650 | 5/1959 | Ruddock et al. | 324—6 |
| 2,929,984 | 3/1960 | Puramen et al. | 324—6 |
| 2,948,846 | 8/1960 | Coufleau | 324—6 |
| 2,995,699 | 8/1961 | Snelling et al. | 324—6 X |
| 3,105,190 | 9/1963 | Norris | 324—6 |
| 3,123,766 | 3/1964 | Ruddock et al. | 324—6 X |
| 3,214,686 | 10/1965 | Elliott et al. | 324—6 |

RUDOLPH V. ROLINEC, *Primary Examiner.*

WALTER L. CARLSON, *Examiner.*

G. R. STRECKER, *Assistant Examiner.*